United States Patent [19]

Chuchin et al.

[11] 4,001,173

[45] Jan. 4, 1977

[54] PROCESS FOR PRODUCING VINYL POLYMERS

[76] Inventors: Alexandr Evgenievich Chuchin, Petrovsko-Razumovsky proezd, 20, kv. 52; Leonid Leonidovich Proskurin, 2 Sinichkina ulitsa, 26, kv. 76; Irina Jurievna Kalnova, Teply Stan, 3 mikroraion, korpus 41, kv. 97; Vladimir Viktorovich Rozhkov, shosse Entuziastov, 212, korpus 4, kv. 474, all of Moscow, U.S.S.R.

[22] Filed: Jan. 22, 1975

[21] Appl. No.: 543,049

[52] U.S. Cl. .......................... 260/45.7 R; 526/89; 526/230
[51] Int. Cl. ..................................... C08k 3/00
[58] Field of Search ............. 260/45.7 R; 526/89, 526/230

[56] References Cited

UNITED STATES PATENTS

| 2,420,862 | 5/1947 | Chambers | 260/45.7 R |
| 3,892,815 | 7/1975 | Schmenlingl | 260/45.7 R |

*Primary Examiner*—Donald E. Czajz
*Assistant Examiner*—W. E. Parker

[57] ABSTRACT

A process for producing vinyl polymers involving polymerization of vinyl monomers in the presence of polyarylenealkylenes of the formula:

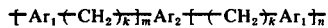

wherein $Ar_1$ and $Ar_2$ are

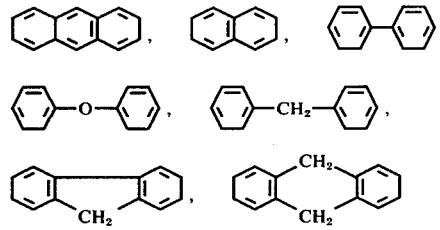

$m + n + 2$ to $30$, $k = 1$ or $2$, at $k = 1$ $Ar_1$ and $Ar_2$ are also

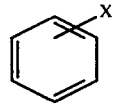

where X is H, a $C_1$–$C_4$ alkyl, or in the presence of hydroperoxides of said polyarylenealkylenes; said polyarylenealkylenes or hydroperoxides thereof are used in an amount ranging from 0.01 to 15% by weight of the starting vinyl monomers. The process of the present invention makes it possible to obtain vinyl polymers featuring an enhanced heat-resistance and, in some cases, improved mechanical and electrical properties.

4 Claims, No Drawings

PROCESS FOR PRODUCING VINYL POLYMERS

The present invention relates to processes for producing vinyl polymers such as polymethylmethacrylate, polybutylmethacrylate, polystyrene, a copolymer of butylmethacrylate with α,ω-methacryl-(bis-ethylene glycol)-phthalate.

Vinyl polymers are useful in chemistry, electrical engineering, electronics, the food industry, aircraft manufacturing as well as in many other fields.

Processes are known for producing vinyl polymers by polymerization of vinyl monomers.

These prior art processes, however, do not provide for the production of polymers having sufficiently high heat-resistance.

It is known that conventional inhibitors-antioxidants such as aromatic amines and phenols are capable of inhibiting thermal-oxidative destruction of polymers at elevated temperatures. Therefore, introduction of an inhibitor into a polymer results in an enhanced heat-resistance thereof.

Conventional inhibitors-antioxidants, however, tend to supress polymerization of vinyl monomers, wherefore the possibility of using them in said polymerization process for the purpose of production of heat-resistant vinyl polymers is excluded. The use of said inhibitors-antioxidants is limited to the cases where it is possible to introduce an inhibitor into a final polymer only (on condition that a further processing of the polymer is contemplated). This mode (introduction of an inhibitor into a final polymer), is, however, inapplicable for protection of polymeric thermosetting materials and articles produced by in situ polymerization of vinyl monomers from thermal-oxidative destruction. Failure to stabilize polymeric materials and articles of this type results from the fact that such polymeric materials and articles cannot be further processed. In other words, it is impossible to ensure introduction of an inhibitor into the polymer bulk.

It is an object of the present invention to provide such a process for producing vinyl polymers by way of polymerization of vinyl monomers which would make it possible to obtain the desired products featuring an enhanced heat-resistance.

This and other objects of the present invention are accomplished by effecting the polymerization of vinyl monomers in the presence of polyarylenealkylenes of the formula:

$$-[Ar_1-(CH_2)-_k]-_m Ar_2[-(CH_2)-_k Ar_1]-_n,$$

wherein $Ar_1$ and $Ar_2$ are

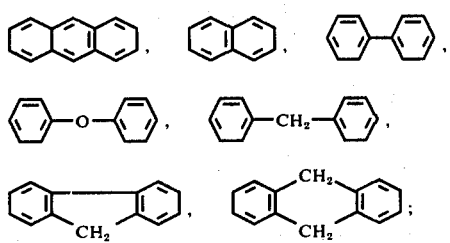

$m + n = 2$ to 30; $k=1$ or 2, at $k=1$ $Ar_1$ and $Ar_2$ are also

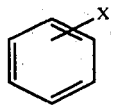

wherein $X = H$, a $C_1$–$C_4$ alkyl, or in the presence of hydroperoxides of said polyarylenealkylenes, said polyarylencalkylenes or hydroperoxides thereof are employed in an amount ranging from 0.01 to 15% by weight of the starting vinyl monomers.

Polyarylenealkylenes of the above-given formula and hydroperoxides thereof represent a novel class of inhibitors of thermal oxidative destruction of vinyl polymers. These polyarylenealkylenes do not suppress the polymerization of the starting vinyl monomers, while hydroperoxides thereof serve as initiators of said polymerization process.

Vinyl polymers produced by the process of the present invention are far more stable at elevated temperatures in comparison to conventional vinyl polymers produced by polymerization of vinyl monomers without the use of said polyarylenealkylenes or hydroperoxides thereof. The use of polyarylenealkylene hydroperoxides makes it possible to produce polymers featuring greater heat-resistance as compared to the use of polyarylenealkylenes per se.

In some cases the process of the present invention makes it possible to improve, simultaneously with heat-resistance, other properties of vinyl polymers such as mechanical and electrical properties.

It is possible to obtain both long- and short-term heat-resistance of the polymers being obtained by varying the concentrations of polyarylenealkylenes or hydroperoxides thereof. Small concentrations of polyarylenealkylenes or hydroperoxides thereof ensure highly effective but short-term heat-resistance of polymers, whereas the use of greater concentrations ensures long-term heat-resistance, though rather less effective. In this latter case, heat-resistance of polymers during the initial period of the thermal-oxidative ageing is less than in the case of using small concentrations of polyarylenealkylenes or hydroperoxides thereof.

While conducting polymerization of vinyl monomers in the presence of polyarylenealkylenes, it is advisable to effect this process also in the presence of initiators taken in an amount within the range of from 0.1 to 2% by weight of the starting vinyl monomers, whereby the progress of the polymerization process may be substantially accelerated.

Initiators suitable for the process of the present invention may be exemplified by benzoyl peroxide, azoisosuccinic acid dinitrile, and isopropylbenzene hydroperoxide.

The polymerization process, however, may be initiated by any other conventional method used in the production of vinyl polymers such as by irradiation or photo initiation.

Among all possible methods of initiating polymerization of vinyl monomers the use of chemical initiators is the most preferred. This method is technologically simple and does not require any special equipment.

Polyarylenealkylenes of the above-given formula may be prepared by various methods such as by interaction of haloaromatic and haloaliphatic compounds according to the Wurtz-Fittig reaction; condensation of formaldehyde with aromatic compounds according to the Friedel-Crafts reaction: (a) interaction of methylol, haloalkyl- or alkoxyakyl-substituted aromatic compounds (such as benzyl chloride, α-ethoxyethylnaphthalene, corresponding derivatives of diphenyl ether) with aromatic compounds containing no methylol, haloalkyl or alkoxyalkyl groups (such as toluene, diphenyl, naphthalene); (b) interaction of 1,2-dichloroethane with aromatic compounds such as diphenyl and naphthalene.

Hydroperoxides of said polyarylenealkylenes are prepared by oxidizing said polyarylenealkylene with oxygen or an oxygen-containing gas.

Polymerization of vinyl monomers in accordance with the process of the presence invention in the present of polyarylene alkylenes or hydroperoxides thereof is conducted using conventional technologies: block-polymerization, emulsion-, suspension- or solution-polymerization. The reaction may be conducted in air, under vacuum or in an inert gaseous medium. Therewith, only polymerization time is changed, since air is known to inhibit this process.

For better understanding of the present invention the following Examples illustrating the production of vinyl polymers featuring a high heat-resistance are given hereinbelow.

EXAMPLE 1

The polyarylenealkylene as used in this Example is prepared by reacting benzyl chloride with diphenyl ether at a molar ratio of the reactants of 80:20 respectively in the presence of SnCl$_4$ as a catalyst taken in an amount of 0.75 mol.% of the benzyl chloride at a temperature of from 20 to 30° C. The resulting polyarylenealkylene corresponds to the above-given generic formula, wherein Ar$_1$ is

Ar$_2$ is

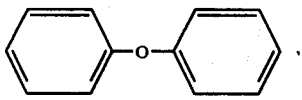

$k = 1, m + n = 4$.

0.5 g of the polyarylenealkylene is dissolved in 9.5 g of α,ω-methacryl-(bis-ethylene glycol)-phthalate; the thus-obtained solution is placed into a cylindrical mold with a diameter of 35 mm and block-polymerization is effected upon heating for 9 hours, the temperature being elevated at a constant rate from 20° to 180° C. A polymer sample in a form of a disc with the diameter of 35 mm and 1 mm thickness is thus obtained.

A control sample is simultaneously prepared from a polymer produced by polymerization of 10 g of α,ω-methacryl-(bis-ethylene glycol)-phthalate under the same conditions but without the polyarylenealkylene.

Heat-resistance of the polymers is evaluated by weight losses of the samples after maintaining in air at 200° C for 16 days. Weight loss of the polymer sample produced in accordance with the present invention is 12%, whereas the control sample has a weight loss of 35%, i.e. 3 times as high.

EXAMPLE 2

A polyarylene alkylene corresponding to the above-given generic formula, wherein

$k = 1, m + n = 2$, is prepared by reacting a chloromethylation product of diphenyl ether (chlorine content 14.5%) with diphenyl ether (molar ratio of the reactants 50:50) in the presence of SnCl$_4$ as a catalyst taken in the amount of 1 mol.% of the chloromethylation product of diphenyl ether. The reaction is conducted for 4.5 hours by elevating the temperature from 20° to 140° C.

0.4 g of the resulting polyarylenealkylene is dissolved in 9.6 g of butylmethacrylate and polymerization is then effected according to the schedule: 2 hours at 120° C and 10 hours at 160° C. Molecular weight of the resulting polymer is $1.4 \times 10^6$.

A control sample is simultaneously prepared by polymerization of 10 g of butylmethacrylate under the same conditions but without the polyarylenealkylene.

Heat-resistance of the vinyl polymer samples is determined in the following manner. 0.5 g of the polymer is melted at 200° C in a box made of aluminum foil (box dimensions 45×45×10 mm), whereafter the molten polymer is maintained at 200° C in the air for 2 hours. Under said conditions the polymer sample prepared according to the present invention lost 10% of its weight, while the control sample under the same conditions lost 30% of its weight, i.e. 3 times as high.

EXAMPLES 3-12

The polyarylenealkylenes used in these Examples are prepared by reacting benzyl chloride with the following aromatic compounds: anthracene, naphthalene, diphenyl, diphenyl ether, fluorene, dihydroanthracene, toluene, ethylbenzene, isopropylbenzene, and tetralin. Molar ratios between benzyl chloride and the listed aromatic compounds are within the range of from 80–98; 20–2 respectively. Said ratios are varied to prepare polyarylenealkylenes with different predetermined values of $m + n$. The reaction is conducted in the presence of SnCl$_4$ as a catalyst taken in the amount of 1 mol% of benzyl chloride at a temperature ranging from 20° to 60° C. The resulting polyarylenealkylenes are isolated by precipitation from a benzene solution into ethanol. The polyarylenealkylene corresponds to the above-given formula, wherein Ar$_1$ is

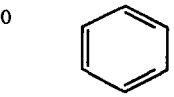

Ar$_2$ and $m+n$ are given in Table 1 hereinbelow; $k=1$.

Said polyarylenealkylenes are used for the production of polymethylmethacrylate by polymerization of methylmethacrylate. To this end, the polyarylenealkylenes (a corresponding polyarylenealkylene for each Example) are dissolved in methyl methacrylate in the amount of 5% by weight of the monomer. Then a polymerization initiator, viz. benzoyl peroxide is added in the amount of 0.5% by weight of the monomer and block-polymerization is effected according to the schedule: 6 hours at 60° C; 4 hours at 80° C, and 2 hours at 110° C. Molecular weight of the resulting polymers is about $1.10^5$. Films with a thickness of about 0.5 mm are cast from benzene solutions of said polymers. Heat-resistance of the polymers is evaluated by weight loss of the films after maintaining thereof in air at 220° C. A control sample is simultaneously prepared from the film of the polymer produced by polymerization of methyl methacrylate under the same conditions but without the polyarylenealkylenes.

Data showing heat-resistance of the polymers produced in Examples 3 to 12 depending on a particular polyarylenealkylene used for the polymer production as well as data showing heat-resistance of the control sample.

Table 1

| Example No. | Ar₂ | m + n | Weight loss at 220° C in the air for 4 hours, % |
|---|---|---|---|
| 1 | 2 | 3 | 4 |
| 3 | 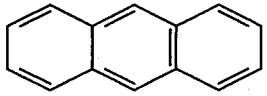 | 20 | 3 |
| 4 | 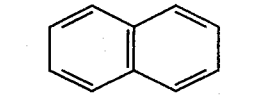 | 5 | 4 |
| 5 | 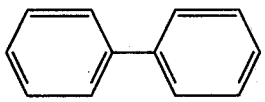 | 4 | 19 |
| 6 | 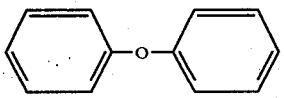 | 30 | 6 |
| 7 |  | 6 | 5 |
| 8 | 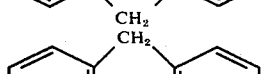 | 8 | 4 |
| 9 | 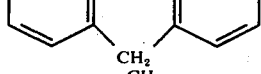 | 7 | 20 |
| 10 | 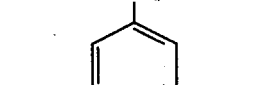 | 4 | 21 |
| 11 | 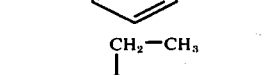 | 5 | 24 |
| 12 | 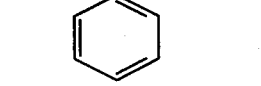 | 5 | 6 |
| Control Sample | — | — | 67 |

From the data shown in Table 1 it is seen that the process of the present invention makes it possible to produce polymers featuring 3 to 20 times less weight loss at an elevated temperature than the control sample. i.e. polymer prepared by the prior art process.

EXAMPLE 13

The polyarylenealkylene used in this Example is prepared by reacting 1 g.mol. of α-ethoxyethylnaphthalene with 0.5 g. mol. of naphthalene in the presence of 0.01 g.mol. of naphthalene in the presence of 0.01 g.mol. of SnCl₄ at a temperature of 120° C. The resulting polyarylenealkylene corresponds to the above-given generic formula, wherein Ar₁ = Ar₂ = 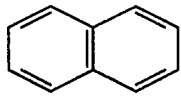 ;

k = 1, m + n = 3.

The polyarylenealkylene is dissolved in methyl methacrylate in the amount of 0.1% by weight of the starting monomer, whereafter benzoyl peroxide is added thereto in the amount of 0.5% by weight of said monomer and polymerization is conducted in a manner similar to that described in Examples 3–12. A film with a thickness of about 0.5 mm is cast from a benzene solution of the resulting polymer. The polymer heat-resistance is evaluated by the film weight loss after maintaining in air at 220° C. Simultaneously, a control film sample is prepared from the polymer produced by polymerization of methyl methacrylate under the above-described conditions but without using the polyarylenealkylene.

After being maintained in air at 220° C for 24 hours, the film of the polymer produced in accordance with the present invention lost only 4% of its weight, whereas the control sample under the same conditions lost 84% of its weight. Hence, the polymer produced by the process of the present invention is more than 20 times as heat-resistant as the control sample, i.e. polymer produced by the prior art process.

EXAMPLE 14

The polyarylenealkylene described in Example 2 is dissolved in butyl methacrylate in the amount of 1% by weight of the starting monomer, benzoyl peroxide in the amount of 1% by weight of the monomer is added thereto, and block-polymerization is effected at a temperature of 90° C for 4 hours to give a polymer with a molecular weight of about $2.1 \times 10^5$.

A cylindrical sample with a diameter of 5 mm and height of 15 mm is cut out of the resulting polymer. The polymer heat-resistance is determined by the sample weight loss after being maintained in air at a temperature of 220° C. At the same time a control cylindrical sample is prepared from the polymer produced by polymerization of butyl methacrylate under the same conditions but without using the polyarylenealkylene.

After exposure in air at 220° C for 24 hours, the sample of the polymer produced in accordance with the process of the present invention lost 18% of its weight, whereas the control sample of the polymer produced by the prior art process lost, under the same conditions, 72% of its original weight.

EXAMPLE 15

The polyarylenealkylene described in Example 13 is dissolved in methyl methacrylate in the amount of 0.01% by weight of the starting monomer, whereafter benzoyl peroxide is added thereto in the amount of 1% by weight of the monomer, and polymerization is effected at a temperature of 60° C for 2.5 hours and then at 125° C for 4 hours. The resulting solid polymer with a molecular weight of about $1.7 \times 10^5$ in the amount of 1 g is dissolved in 10 ml of benzene and a film with a thickness of 0.5 mm is cast from the solution. Simultaneously, a control sample of the polymer produced by polymerization of methyl methacrylate under the same conditions but without using the polyarylenealkylene is prepared.

Weight loss of the film of the polymer produced by the process of the present invention is, after maintaining in air at 220° C for 2 hours, 23%, whereas weight loss of the control sample of the polymer produced by the prior art process is 40% under the same conditions.

EXAMPLE 16

A polyarylenealkylene of the above-given generic formula, wherein Ar₁ is

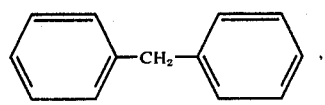 ,

Ar₂ is

$k = 1$, $m + n = 2$ is produced by reacting 1 g.mol. of p-chloromethyldiphenylmethane with 0.5 g.mol. of benzene in the presence of 0.01 g.mol. of SnCl₄ at the temperature of 25° C.

The resulting polyarylenealkylene is dissolved in α,ω-methacryl-(bis-ethylene glycol)-phthalate in the amount of 10% by weight of the starting monomer, whereafter benzoyl peroxide is introduced thereinto in the amount of 1% by weight of the starting monomer and polymerization is effected at the temperature of 150° C for 0.5 hour to give a sample of a nonfusible, insoluble polymer in the form of a disc with a diameter of 35 mm and 1 mm thickness. The control sample of the polymer is produced by polymerization of α,ω-methacryl-(bis-ethylene glycol)-phthalate under the same conditions but without using the polyarylenealkylene.

The sample of the polymer produced by the process of the present invention after exposure to a temperature of 200° C in air for 9 days lost 22% of its weight, whereas the control sample under the same conditions lost 36% of its weight, i.e. about 1.5 times higher.

EXAMPLES 17–18

A polyarylenealkylene of the generic formula given hereinbefore, wherein Ar₁ and Ar₂ are the same and correspond to radicals shown in Table 2 hereinbelow, and $k=2$, is prepared by reacting diphenyl or naphthalene with 1,2-dichloroethane (molar ratio 60:40) in the presence of AlCl₃ as a catalyst taken in the amount of 10% by weight of 1,2-dichloroethane at a temperature within the range of from 70° to 120° C.

Said poly arylenealkylenes are used for the production of polymethylmethacrylate by polymerization of methyl methacrylate. To this end, the polyarylenealkylenes (a corresponding polyarylenealkylene for each Example shown in Table 2) are dissolved in methylmethacrylate in the amount of 1% by weight of the monomer, Then, benzoyl peroxide is added in the amount of 1% by weight of the monomer and polymerization is effected in much the same manner as that described in Example 13. Films of a 0.5 mm thickness are cast from benzene solutions of the resulting polymers. Simultaneously, a control film sample is prepared from the polymer produced by polymerization of methyl methacrylate under the same conditions but without using the polyarylenealkylene.

Weight losses of the films of the polymers produced by the process of the present invention are shown in Table 2.

Table 2

| Example No. | $Ar_1 = Ar_2$ | m + n | Weight loss at 220° C in air for 3 hours, % |
|---|---|---|---|
| 17 | biphenyl | 8 | 10 |
| 18 | naphthalene | 4 | 2 |
| Control sample | — | — | 60 |

The following Examples 19 through 24 illustrate a greater effectiveness of using polyarylenealkylene hydroperoxides, as compared to the polyarylenealkylenes per se, for the production of vinyl polymers with an elevated heat-resistance.

EXAMPLES 19–24

In Examples 19, 21, and 23 use is made, for the production of vinyl polymers, of polyarylenealkylenes, while in Examples 20, 22, and 24 — of hydroperoxides of said polyarylenealkylenes. Thus, in Example 19 a polyarylenealkylene is used, and in Example 20 — its respective hydroperoxide; in Example 21 another polyarylenealkylene, is used while in Example 22 — its respective hydroperoxide; in Example 23 a third polyarylenealkylene is used, and in Example 24 — its respective hydroperoxide.

The polyarylenealkylene as used in Example 19 is prepared by reacting p-methoxymethyldiphenyl ether with diphenyl ether (molar ratio 90:10) in the presence of $SnCl_4$ as a catalyst taken in the amount of 1 mol.% of the p-methoxymethyldiphenyl ether at a temperature of 120° to 140° C. The resulting polyarylenealkylene corresponds to the generic formula given hereinbefore, wherein

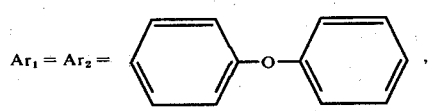

$k=1, m+n=12$.

The polyarylenealkylene used in Example 21 is prepared by reacting p-hydroxymethyldiphenyl ether with diphenyl ether (molar ratio 82:18) in the presence of $SnCl_4$ as a catalyst taken in the amount of 1 mol.% of the p-hydroxymethyldiphenyl ether at a temperature of 120° to 140° C. The resulting polyarylenealkylene corresponds to the generic formula given hereinbefore, wherein

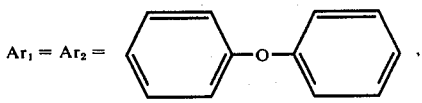

$k=1, m + n = 3$.

The polyarylenealkylene used in Example 23 is prepared by reacting benzyl chloride with diphenyl ether (molar ratio 80–20) in the presence of $SnCl_4$ as a catalyst taken in the amount of 0.8 mol.% of the benzyl chloride at a temperature of 30° to 70° C. The resulting polyarylenealkylene corresponds to the generic formula given hereinbefore, wherein $Ar_1$ is

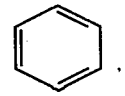

$Ar_2$ is

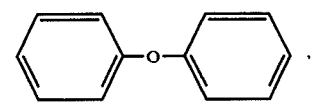

$k = 1, m + n = 5$.

The polyarylenealkylene hydroperoxides used in Examples 20, 22, and 24 are prepared by oxidizing the respective polyarylenealkylenes by bubbling air through solutions of said polyarylenealkylenes in toluene at 90° C in the presence of an initiator, viz. azoisosuccinic acid dinitrile in the amount of 10% by weight of the polyarylenealkylenes. The resulting hydroperoxides are isolated by precipitation into hexane and dried in vacuum at 20° C to a constant weight. The content of active (hydroperoxidic) oxygen in said polyarylenealkylene hydroperoxides is within the range of from 0.5 to 0.7%.

Then, two series of vinyl polymer samples are prepared. The first series is prepared in Examples 19, 21, and 23 by polymerization of methyl methacrylate or butyl methacrylate in the presence of the respective polyarylenealkylenes in the amounts shown in Table 3 hereinbelow and in the presence of a polymerization initiator, viz. benzoyl peroxide in the amount of 0.1% by weight of the starting monomer. The molecular weights of the resulting polymers are within the range of from $1\times10^5$ to $5\times10^5$. The second series of samples is prepared in Examples 20, 22, and 24 by polymerization of methylmethacrylate or butyl methacrylate in the presence of the hydroperoxides of the corresponding polyarylenealkylenes. Amounts of the hydroperoxides are shown in Table 3. In Examples 20, 22, and 24 benzoyl peroxide is not used, since the polymerization process is initiated by the polyarylenealkylene hydroperoxides per se. Molecular weights of the resulting polymers are within the range of $1-2\times10^6$. The polymerization process, irrespective of the sample series, is conducted in accordance with the following schedule: 2 hours at 75° C, then 6 hours at 130° C for methyl methacrylate; 4 hours at 110° C and then 6 hours at 130° C for butyl methacrylate.

Control samples of the polymers are simultaneously prepared by polymerization of methyl methacrylate or butyl methacrylate under the same conditions as above but without the polyarylenealkylenes and hydroperoxides thereof.

Heat-resistance of the resulting samples of vinyl polymers is determined in the following manner. A polymer in the amount of 0.5 g is melted in a box made of aluminum foil (box dimensions are 45×45×10 mm), whereafter the molten polymer is maintained in air at 200° C for a predetermined period (polymer ageing time) and then weight loss is determined. Shown in Table 3 are comparative data illustrating the heat-resistance of vinyl polymers produced using polyarylenealkylenes (PAA) and hydroperoxides thereof as well as produced without using said compounds.

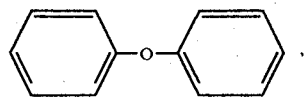

$k = 1, m + n = 5$ with the active oxygen content in the hydroperoxide of 0.3% are dissolved in 80 parts by weight of butyl methacrylate and placed into a flask provided with a stirrer, thermometer, and reflux condenser. The flask with the reaction mass is placed into a thermostat at 127° C and butyl methacrylate is prepolymerized for 13 minutes. Then the reaction mixture is cooled to 20° C and mixed with 5 parts by weight of $\alpha,\omega$-methacryl-(bis-ethylene glycol)-phthalate. The reaction mass thus obtained is poured into metallic molds designed so as to produce samples in the form of discs with the diameter of 100 mm and 1 mm thickness. The molds are placed in a thermostat heated to 150° C for 30 minutes and copolymerization of non-polymerized butyl methacrylate with $\alpha,\omega$-methacryl-(bis-ethylene glycol)-phthalate is effected. The copolymerization is completed at 180° C for 1 hour. The samples, after being exposed to a temperature of 200° C in air for 48 hours, lost 5% of their weight, whereas the control sample prepared in the same manner except that instead of a polyarylenealkylene hydroperoxide an equimolar, as to the active oxygen content, amount of benzoyl peroxide was used, lost under the same conditions 60% of its original weight.

The following Examples 26-27 illustrate the possibility of a simultaneous increase in heat-resistance, mechanical and electrical properties of vinyl polymers produced in accordance with the process of the present invention.

EXAMPLES 26-27

Table 3

| Ex. No. | Vinyl monomer | PAA amount, % of the monomer weight | PAA hydroperoxide amount, wt.% of the monomer | Ageing time, hours | Samples of first series | Weight loss, % Samples of second series | Control samples |
| --- | --- | --- | --- | --- | --- | --- | --- |
| 1 | 2 | 3 | 4 | 5 | 6 | 7 | 8 |
| 19 | methyl methacrylate | 1.14 | — | 1 | 18 | — | |
| 20 | methyl methacrylate | — | 1.14 | 1 | — | 5 | 55 |
| 21 | butyl methacrylate | 2.0 | — | 5 | 20 | — | |
| | | | | | | | 45 |
| 22 | butyl methacrylate | — | 2.0 | 5 | — | 10 | |
| 23 | " | 4.0 | — | 40 | 30 | — | 90 |
| 24 | " | — | 4.0 | 40 | — | 10 | |

EXAMPLE 25

12.7 parts by weight of a polyarylenealkylene hydroperoxide corresponding to the generic formula given hereinabove, wherein $Ar_1$ is

$Ar_2$ is

In each of these Examples one sample of a copolymer of butyl methacrylate and $\alpha,\omega$-methacryl-(bis-ethylene glycol)-phthalate is prepared in accordance with the procedure described in Example 25. The only distinction resides in that in Example 26 prepolymerization of butyl methacrylate is effected in the presence of 5 parts by weight of a polyarylenealkylene corresponding to the generic formula given hereinbefore, wherein $Ar_1$ is Ar₂ is 

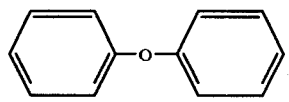

, k=1, m+n=5, the starting monomer is taken in the amount of 95 parts by weight and the copolymerization process is effected in the presence of a polymerization initiator, viz. benzoyl peroxide in the amount of 0.8% by weight of the monomer. In Example 27, unlike Example 25, prepolymerization of butyl methacrylate is effected in the presence of 5 parts by weight of the hydroperoxide of the same polyarylenealkylene (the active oxygen content in the hydroperoxide is 0.3%) and the starting monomer is taken in the amount of 95 parts by weight. In Examples 26 and 27, unlike Example 25, 0.4 parts by weight of α,ω-methacryl-(bis-ethylene glycol)-phthalate is taken for the copolymerization process.

For comparison purposes a control sample of the copolymer of butyl methacrylate and α,ω-methacryl-(bis-ethylene glycol)-phthalate is prepared. It is prepared under the same conditions as the copolymer samples in Examples 26 and 27 except that a polyarylenealkylene (PAA) or its hydroperoxide are not used. Thus, at the stage of prepolymerization of butyl methacrylate benzoyl peroxide is used as an initiator in the amount of 0.8% by weight of the monomer.

Table 4 shows mechanical and electrical properties, as well as heat-resistance of samples of the copolymers produced by the process of the present invention in comparison with corresponding properties of the control sample.

Table 4

| Sample properties | Values of the sample properties | | |
|---|---|---|---|
| | Sample of Example 26 (PAA) | Sample of Example 27 (PAA hydroperoxide) | Control sample |
| 1 | 2 | 3 | 4 |
| Ultimate tensile strength, kg/cm² | 50 | 80 | 60 |
| Weight loss, % after maintaining the sample in air at 180° C for: | | | |
| 2 days | 9 | 2.5 | 22 |
| 4 days | 10 | 3 | 30 |
| 8 days | 10 | 3.5 | 42 |
| 16 days | 10 | 4 | 51 |
| 50 days | 12 | 5 | 66 |
| Specific volumetric resistivity, ohm.cm. at: | | | |

Table 4-continued

| Sample properties | Values of the sample properties | | |
|---|---|---|---|
| | Sample of Example 26 (PAA) | Sample of Example 27 (PAA hydroperoxide) | Control sample |
| 20° C | $5.1 \times 10^{13}$ | $9 \times 10^{14}$ | $4.7 \times 10^{13}$ |
| 130° C | $2.5 \times 10^{11}$ | $1.7 \times 10^{12}$ | $3.0 \times 10^{11}$ |
| 150° C | $2.3 \times 10^{10}$ | $7.4 \times 10^{11}$ | $1.2 \times 10^{10}$ |

It is seen from Table 4 that the sample of the copolymer produced in Example 27 features the highest heat-resistance and mechanical and electrical properties exceeding by several times, and in some cases by tens of times, the corresponding properties of the control sample.

The following Examples 28 to 31 illustrate the influence of polyarylenealkylene concentration on heat-resistance of cross-linked (thermosetting) polymers produced by polymerization of a bifunctional vinyl monomer.

EXAMPLES 28–31

A polyaryenealkylene corresponding to the generic formula given hereinabove, wherein Ar₁ is

Ar₂ is

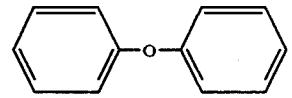

k=1, m+n=7 is prepared by reacting benzyl chloride with diphenyl ether (molar ratio 80:20) in the presence of SnCl₄ as a catalyst taken in the amount of 0.9 mol.% of the benzyl chloride at a temperature ranging from 20° to 60° C.

The resulting polyarylenealkylene is dissolved, in different amounts, in α,ω-methacryl-(bis-diethylene glycol)-phthalate (the polyarylenealkylene amounts are shown in Table 5 hereinbelow as percentage of the monomer weight). Then, benzoyl peroxide is added in the amount of 1% by weight of the starting monomer and polymerization is conducted at 125° C for 3 hours. Samples in the form of discs with a diameter of 35 mm and 2 mm thickness are prepared from the resulting polymers. At the same time, a control sample is prepared from the polymer produced under the same conditions but without using the polyarylenealkylene.

Heat-resistance of the polymer samples is determined by weight loss thereof after maintaining in air at 180° C. Test results are given in Table 5.

Table 5

| Time of sample exposure to 180° C, days | Weight losses | | | | |
|---|---|---|---|---|---|
| | Sample of Example 28 (0.5% PAA) | Sample of Example 29 (1.0% PAA) | Sample of Example 30 (5.0% PAA) | Sample of Example 31 (10.0% PAA) | Control sample |
| 2 | 4.4 | 3.4 | — | 2.7 | 5.5 |

Table 5-continued

| Time of sample exposure to 180° C, days | Weight losses | | | | |
|---|---|---|---|---|---|
| | Sample of Example 28 (0.5% PAA) | Sample of Example 29 (1.0% PAA) | Sample of Example 30 (5.0% PAA) | Sample of Example 31 (10.0% PAA) | Control sample |
| 5 | 6.5 | 5.6 | 5.6 | 4.4 | 8.7 |
| 9 | 8.5 | 7.7 | 6.6 | 5.4 | 11.4 |
| 47 | 19.9 | 18.4 | — | 11.6 | 25.3 |

The sample of Example 30 lost 14.3% of its weight for 68 days at 180° C, which was less than the control sample weight loss for 47 days at the same temperature.

The following Examples 32–34 illustrate the influence of the ($m+n$) integer when $Ar_1$ and $Ar_2$ are different i.e. influence of proportions of different-type units $Ar_1$ and $Ar_2$ on heat-resistance of cross-linked (thermosetting) polymers produced by polymerization of a bifunctional vinyl monomer in the presence of a polyarylenealkylene.

EXAMPLES 32–34

The polyarylenealkylenes used in these Examples are prepared by reacting benzyl chloride with diphenyl ether in the presence of $SnCl_4$ as a catalyst taken in the amount of 1 mol.% of the benzyl chloride at a temperature within the range of from 30° to 60° C. In Examples 32, 33, and 34 the molar ratio between benzyl chloride and diphenyl ether is respectively 87.5:12.5; 93:7, and 96.5:3.5. The resulting polyarylenealkylenes correspond to the above-given generic formula, wherein $Ar_1$ is

$Ar_2$ is

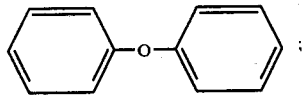

$k=1$; meanings of $m+n$ are varied from one Example to another, which is obtained by changing the ratio between benzyl chloride and diphenyl ether in the production of the corresponding polyarylenealkylenes.

The polyarylenealkylenes are dissolved in $\alpha,\omega$-methacryl(bis-diethylene glycol)-phthalate in the amount of 5% by weight of the starting monomer. Then benzoyl peroxide is added in the amount of 1% by weight of the monomer and polymerization is effected at 125° C for 3 hours to give samples of non-fusible, insoluble polymers in the form of discs with a diameter of 35 mm and thickness of 1 mm. Simultaneously, a control sample of the polymer prepared under the same conditions but without using the polyarylenealkylenes is made.

Heat-resistance of the polymeric samples is evaluated by weight loss after maintaining in air at 180° C. Test results are given in Table 6 hereinbelow.

Table 6

| Time of sample exposure at 180° C, days | Weight losses, % | | | |
|---|---|---|---|---|
| | Sample of Example 32 ($m+n=6$) | Sample of Example 33 ($m+n=10$) | Sample of Example 34 ($m+n=25$) | Control sample |
| 2 | 7.1 | 7.2 | 7.3 | 9.3 |
| 6 | 9.5 | 9.3 | 9.7 | 16.2 |
| 9 | 11.1 | 11.0 | 11.8 | 22.3 |
| 16 | 13.1 | 13.3 | 14.8 | 29.5 |
| 56 | 33.8 | 34.3 | 36.8 | 55.8 |

EXAMPLE 35

The polyarylenealkylene of the generic formula given hereinabove, wherein $Ar_1$ is equal to

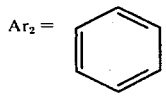

$k=1$, $m+n=5$ is prepared by reacting benzyl chloride with benzene (molar ratio 80:20) in the presence of $SnCl_4$ as a catalyst taken in the amount of 1 mol.% of the benzyl chloride at 20° C.

The resulting polyarylenealkylene is dissolved in styrene in the amount of 5% of the starting monomer weight. Then benzoyl peroxide in the amount of 2% by weight of styrene and a solvent, viz. benzene in the amount equal to the amount of styrene are added thereto. The solution is placed in a flask provided with a reflux condenser and polymerization is effected in the solution at 90° C for 5 hours to give a polymer with a molecular weight of about $3.5 \times 10^4$. Then, the resulting polymer solution is cooled to 20° C and a film is cast therefrom. After elimination of benzene by evaporation in air and drying of the polymer film in vacuum, the film thickness is 0.5 mm. At the same time, a control sample is prepared from polystyrene prepared under the same conditions as above but without using the polyarylenealkylene.

After maintaining the film of the polymer produced by the process according to the present invention in the air at a temperature of 200° C for 4 hours, the film weight loss is 8%, whereas the control sample under the same conditions has a weight loss of 19%.

EXAMPLE 36

In this Example polymerization of methyl methacrylate is initiated by means of a red-ox system "inorganic salt of a variable valency metal - polyarylenealkylene hydroperoxide."

In doing so, the process is effected as follows. Into a three-neck flask provided with a reflux condenser, dropping funnel, and a stirrer 4.12 g of $FeSO_4 \cdot 7H_2O$ and 19 g of potassium oleate (emulsifier) in 75 ml of distilled water, as well as a mixture of 20 ml of methyl methacrylate and 5 ml of benzene are charged. 1 g of a polyarylenealkylene hydroperoxide, the polyarylenealkylene corresponding to the generic formula given hereinbefore, wherein

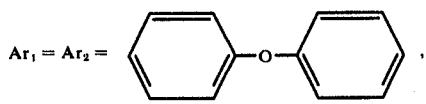

$k=1$, $m + n = 4$, with the active oxygen content in the hydroperoxide of 0.63% is dissolved in 7 ml of dimethylformamide and placed in the above-mentioned dropping funnel. The polymerization is effected under stirring in a stream of nitrogen at 60° C for 5 hours while continuously introducing, into the reaction mixture in the flask, the polyarylenealkylene hydroperoxide dissolved in dimethylformamide from the dropping funnel. The polymer precipitating during its formation is separated, on completion of the reaction, from the aqueous layer, dried and re-precipitated from benzene into isopropanol. Then the resulting polymer is washed with ethanol and dried in vacuum to a constant weight to give 11 g of the polymer with an intrinsic viscosity $[\eta]$ in benzene of 1.7 at 25° C.

Simultaneously, a control sample of the polymer is prepared by way of polymerization of methyl methacrylate under conditions similar to those described hereinabove with the exception that instead of the polyarylenealkylene hydroperoxide an equimolar, with respect to the active oxygen content, amount of isopropylbenzene hydroperoxide is used.

A sample of the polymer produced in accordance with the process of the present invention and the control sample are tested for heat-resistance. As a result of temperature elevation from 50° to 300° C at the rate of 2°C/min, the weight loss of the polymer sample of the present invention at 300° C is 8%, while that of the control sample is 34%.

EXAMPLE 37

0.5 g of the polyarylenealkylene described in Example 1 dissolved in 9.48 g of butyl methacrylate, whereafter 0.015 g of isopropylbenzene hydroperoxide is added thereto. The polymerization is effected according to the following schedule: 2 hours at 120° C and 6 hours at 160° C to give a polymer with a molecular weight of about $4.3 \times 10^5$.

Simultaneously, a control polymer sample is prepared by polymerization of butyl methacrylate under the same conditions as above, but without using the polyarylenealkylene.

Heat-resistance of the resulting samples of vinyl polymers is determined in the following manner. A polymer in the amount of 0.5 g is melted at a temperature of 200° C in a box made of aluminum foil (box dimensions 45×45×10 mm), whereafter the molten polymer is maintained in air at 200° C for 20 hours. Weight loss of the polymer produced by the process of the present invention is, under said conditions, 25%, whereas the control sample under the same conditions has weight losses of 65%.

EXAMPLES 38–40

The polyarylenealkylene used in these Examples are prepared by reacting corresponding mixtures of aromatic compounds with 1,2-dichloroethane at the molar ratio of the mixture of aromatic compounds with 1,2-dichloroethane of 60:40. Therewith, in said Examples the following mixtures of aromatic compounds are used: in Example 38 — a mixture of anthracene with dihydroanthracene; in Example 39 — a mixture of naphthalene with diphenyl ether; in Example 40 — a mixture of diphenylmethane with fluorene. The molar ratio of the aromatic compounds in these mixtures is 80:20 respectively. Interaction of said reactants is effected for a period of from 2 to 5 hours at the boiling temperature of the reaction mixture in the presence of $AlCl_3$ as a catalyst taken in an amount ranging from 10 to 20 mol.% of the mixture of aromatic compounds. As a result, polyarylenealkylenes corresponding to the above-given generic formula are obtained; meanings of $Ar_1$, $Ar_2$, $k$, and $m+n$ are given for each of the Examples in Table 7 hereinbelow.

The resulting polyarylenealkylenes (PAA) in specified quantities (see Table 7) are dissolved in butyl methacrylate or methyl methacrylate, mixed with azoisosuccinic acid dinitrile in the amount of 0.2% by weight of the monomer and polymerization is effected according to the following schedule: 2 hours at 75° C, then 6 hours at 130° C for methyl methacrylate; 4 hours at 110° C, then 6 hours at 130° C for butyl methacrylate. The polymers produced in Examples 38 and 39 have molecular weights of about $1.2 \times 10^5$ and $1.1 \times 10^5$ respectively, while the polymer of Example 40 has its molecular weight of about $3 \times 10^5$.

Simultaneously, polymer control samples are prepared by polymerization of methyl methacrylate or butyl methacrylate under the same conditions as above, but without using the polyarylenealkylenes.

Films with a thickness of about 0.5 mm are cast from benzene solutions of the polymers thus prepared. Heat-resistance of the polymers is evaluated by weight loss of the films after maintaining thereof in air at a specified temperature for a predetermined period of time. Data illustrating weight loss of the polymer samples produced in accordance with the process of the present invention in comparison with the control samples are given in Table 7 hereinbelow.

Table 7

| Example No. | Polyarylenealkylene (PAA) | | | | Vinyl monomer | PAA amount, wt. % of the monomer | Test temperature, ° C | Test time, hrs | Weight loss, % | |
| | $Ar_1$ | $Ar_2$ | $m + n$ | $k$ | | | | | Test samples | Control sample |
| --- | --- | --- | --- | --- | --- | --- | --- | --- | --- | --- |
| 38 | (anthracene) | (diphenylmethane with $CH_2$ groups) | 3 | 2 | methyl methacrylate | 1.0 | 220 | 4 | 2 | 70 |

Table 7-continued

| Example No. | Polyarylenealkylene (PAA) Ar₁ | Ar₂ | m + n | k | Vinyl monomer | PAA amount, wt. % of the monomer | Test temperature, °C | Test time, hrs | Weight loss, % Test samples | Control sample |
|---|---|---|---|---|---|---|---|---|---|---|
| 39 | naphthalene | phenyl-O-phenyl | 5 | 2 | " | 0.5 | 220 | 8 | 3 | 77 |
| 40 | phenyl-CH₂-phenyl | diphenylmethane (CH₂ bridge) | 4 | 2 | butyl methacrylate | 1.0 | 200 | 12 | 50 | 70 |

What is claimed is:

1. In a process for polymerizing vinyl monomers, the improvement which comprises carrying out the polymerization in the presence of aromatic compounds selected from the group consisting of (1) polyarylenealkylenes of the formula:

wherein $Ar_1$ and $Ar_2$ are

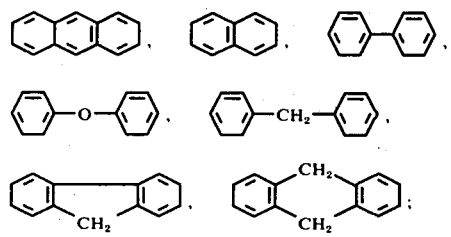

$m + n = 2$ to 30; $k$ is an integer of 1 and 2; and when $k = 1$, $Ar_1$ and $Ar_2$ are also where X is H or a $C_1$–$C_4$ alkyl; and (2) hydroperoxides of said polyarylenealkylenes; said aromatic compounds being used in an amount within the range of from 0.01 to 15% by weight of the starting vinyl monomers.

2. The method of claim 1 wherein the vinyl monomer is selected from the group consisting of styrene, methyl methacrylate, butyl methacrylate, $\alpha,\omega$-methacryl (bis-diethylene glycol)phthalate and $\alpha,\omega$-methacryl (bis-ethylene glycol) phthalate.

3. A process as claimed in claim 1, wherein the polymerization of vinyl monomers in the presence of polyarylenealkylenes is effected also in the presence of initiators taken in an amount of from 0.1 to 2% by weight of the starting vinyl monomers.

4. A process as claimed in claim 3, wherein as the initiators use is made of compounds selected from the group consisting of benzoyl peroxide, azoisosuccinic acid dinitrile, and isopropylbenzene hydroperoxide.

* * * * *